(12) United States Patent
Kadrmas

(10) Patent No.: US 8,218,841 B2
(45) Date of Patent: Jul. 10, 2012

(54) ROTATE AND SLANT PROJECTOR FOR FAST FULLY-3D ITERATIVE TOMOGRAPHIC RECONSTRUCTION

(75) Inventor: Dan J. Kadrmas, North Salt Lake, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 13/108,435

(22) Filed: May 16, 2011

(65) Prior Publication Data
US 2011/0216963 A1    Sep. 8, 2011

Related U.S. Application Data

(62) Division of application No. 11/627,004, filed on Jan. 25, 2007, now Pat. No. 7,970,214.

(51) Int. Cl.
*G06K 9/00* (2006.01)

(52) U.S. Cl. .................................................. 382/128

(58) Field of Classification Search .......... 382/128–134; 128/920–925; 356/39–49; 600/407–414, 600/424–426; 345/581–618
See application file for complete search history.

*Primary Examiner* — Atiba O Fitzpatrick
(74) *Attorney, Agent, or Firm* — Ballard Spahr LLP

(57) ABSTRACT

Disclosed herein are embodiments of a rotate-and-slant projector that takes advantage of symmetries in the geometry to compute truly volumetric projections to multiple oblique sinograms in a computationally efficient manner. It is based upon the 2D rotation-based projector using the fast three-pass method of shears, and it conserves the 2D rotator computations for multiple projections to each oblique sinogram set. The projector is equally applicable to both conventional evenly-spaced projections and unevenly-spaced line-of-response (LOR) data (where the arc correction is modeled within the projector). The LOR-based version models the exact location of the direct and oblique LORs, and provides an ordinary Poisson reconstruction framework. Speed optimizations of various embodiments of the projector include advantageously utilizing data symmetries such as the vertical symmetry of the oblique projection process, a coarse-depth compression, and array indexing schemes which maximize serial memory access.

3 Claims, 15 Drawing Sheets

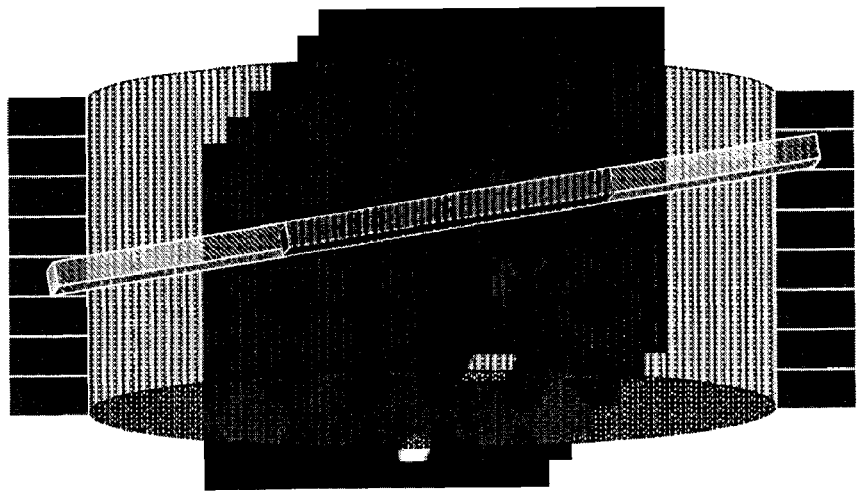
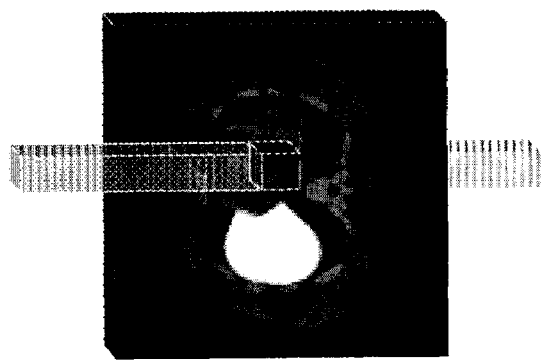
Side (Axial) View
End View
FIG. 5

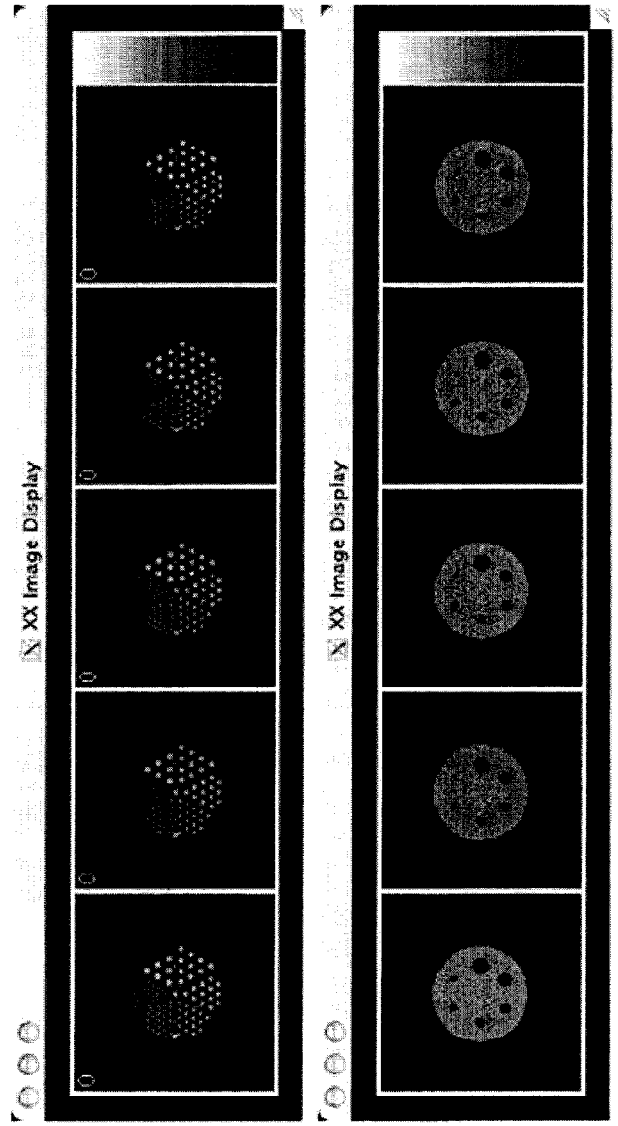

Example images of the Deluxe Jaszczak Phantom for the five reconstruction methods studied: (from left-to-right) FORE AW-OSEM2D, fully-3D AW-OSEM, and fully-3D LOR-OSEM with the ray driven, distance driven, and rotate-and-slant projectors. The smallest 4.8 mm diameter rods are resolved for each reconstruction method, as is the smallest 9.5 mm diameter cold sphere. Small circles of radioactivity are also visible surrounding the support rods for the spheres, which appear between the wedges of hot rods. The images for each of the reconstruction methods were visual similar, with differences in noise texture being the largest effect noted.

FIG. 7

ROTATE AND SLANT PROJECTOR FOR FAST FULLY-3D ITERATIVE TOMOGRAPHIC RECONSTRUCTION

CROSS-REFERENCE TO RELATED APPLICATIONS

This application is a Divisional of, and claims priority to, U.S. Utility application Ser. No. 11/627,004, filed Jan. 25, 2007, now U.S. Pat. No. 7,970,214 the contents of which is incorporated herein by reference.

ACKNOWLEDGEMENTS

This invention was made with government support under Grant R01 CA107353 awarded by the National Institutes of Health (NIH) and National Cancer Institute (NCI). The government may have certain rights in the invention.

BACKGROUND

The present invention relates to the art of diagnostic imaging. In particular, it relates to positron emission tomography (PET) and other diagnostic modes in which a subject is examined and an image of the subject is reconstructed from information obtained during the examination.

Previously, PET has been used to study a radionuclide distribution in subjects. Typically, one or more radiopharmaceuticals are injected into a subject. The radiopharmaceuticals are commonly injected into the subject's blood stream for imaging the circulatory system or for imaging specific organs which absorb the injected radiopharmaceuticals. Detector elements are placed proximate to a surface of the subject to monitor and record emitted radiation. In some instances, the detector elements may be rotated or indexed around the subject to monitor the emitted radiation from a plurality of directions, while in other instances a plurality of detector elements can be placed in fixed locations adjacent to the subject or a portion of the subject. For instance, detector elements may be formed into rings and the rings placed substantially adjacent to one another to form a cylindrical scanner whereby a subject is axially inserted at least partially into the cylinder of detector elements. These are generally known as ring-type scanners. The monitored radiation data from the multiplicity of directions is reconstructed into a three dimensional image representation of the radiopharmaceutical distribution within the subject.

Iterative statistical reconstruction techniques in PET provide a robust framework for accounting for the statistical quality of the measured data, modeling the image acquisition process, and incorporating prior knowledge (if any) about the reconstruction solution. While iterative reconstruction has generally become the standard for PET, complete utilization of such methods has been limited due to large computational demands. This is especially true for fully-3D PET, where both direct and oblique coincidence lines are measured to produce highly sensitive, but very large datasets. A variety of approaches have been proposed for iterative reconstruction of fully-3D PET data. The most direct, and potentially highest quality, implementation requires raw data be operated upon directly by a reconstruction algorithm, thereby making full use of Poisson-based statistical models and avoiding any unnecessary degradation or blurring accompanying data preprocessing steps (e.g. arc-correction). However, these implementations tend to be the most computationally demanding as well. At the other end of the spectrum, pre-processing methods, such as rebinning fully-3D data into a set of 2D sinograms followed by 2D iterative reconstruction, can be used to greatly speed the reconstruction; however, such methods tend to spoil the Poisson statistics of the data and/or introduce undesired blurring or other degradations.

Therefore, what is needed is a means to overcome challenges found in the art, some of which are described above.

SUMMARY

Described herein are embodiments of a projector (and backprojector) for iterative fully-3D PET reconstruction that offers full utilization of iterative statistical reconstruction algorithms, has low computational cost, and is amenable to modeling the physics and spatially-variant resolution effects of the PET acquisition. The projector (and backprojector) can map to either regularly-spaced ("arc corrected") projections or directly from the image to the raw coincidence line-of-response (LOR) measurement space (and vice versa), such that the projection operation explicitly models the non-uniform spacing of the coincidence lines acquired by modern PET tomographs.

One aspect according to the present invention is a projector for iterative fully-3D reconstruction of an image by positron emission tomography (PET) using a scanner comprised of a plurality of detector elements. The projector comprises a volume image memory containing a resultant image volume that is initially estimated and stored in an image matrix. Further comprising the projector is a projection matrix. The projection matrix is comprised of planes of projection data collected at each of a plurality of data collection directions. The data collection directions include azimuthal angles of projection rays or lines-of-response that are perpendicular to the axis of symmetry of the scanner between detector elements in a same transaxial plane of the scanner and axial angles of oblique projection rays or lines of response between detector elements in different transaxial planes of the scanner. The projector also includes a rotator that re-samples the resultant image volume from the volume image memory by rotating the image matrix to a given azimuthal angle of the projection matrix and slanting the columns of the image matrix to each of the axial angles of oblique projection rays or lines-of-response at that given azimuthal angle such that columns of the image matrix align with each of the plurality of data collection directions of the projection matrix. The rotator applies a coarse-depth compression factor to the image matrix such that rows of the image matrix are collapsed onto one another in accordance with the coarse-depth compression factor so depth information of the rotated image matrix is compressed and the image is projected by summing the compressed columns of the image matrix.

Another aspect according to the present invention is a projector for iterative fully-3D reconstruction of an image by positron emission tomography (PET) using a scanner comprised of a plurality of detector elements. The projector comprises a volume image memory containing a resultant image volume that is initially estimated and stored in an image matrix. Further comprising the projector is a projection matrix. The projection matrix is comprised of planes of projection data collected at each of a plurality of data collection directions. The data collection directions include azimuthal angles of projection rays or lines-of-response that are perpendicular to the axis of symmetry of the scanner between detector elements in a same transaxial plane of the scanner and axial angles of oblique projection rays or lines of response between detector elements in different transaxial planes of the scanner. The projector also includes a rotator that re-samples the resultant image volume from the volume image memory by rotating the image matrix to a given azimuthal angle of the projection matrix and slanting the columns of the image matrix to each of the axial angles of oblique projection rays or lines-of-response at that given azimuthal angle such that columns of the image matrix align with each of the plurality of data collection directions of the projection matrix. The image rotation and slanting is performed using volume-of-overlap between 3D volumes of image matrix voxels and a 3D volume of said projection rays or lines-of-response and the oblique projections rays or lines-of-response, such that projection by summing the columns of the image matrix integrates the 3D volume contained within said volume-of-overlap.

Another aspect according to an embodiment of the present invention is a projector for iterative fully-3D reconstruction of an image by positron emission tomography (PET) using a scanner comprised of a plurality of detector elements. The projector comprises a volume image memory containing a resultant image volume that is initially estimated and stored in an image matrix. Further comprising the projector is a projection matrix. The projection matrix is comprised of planes of projection data collected at each of a plurality of data collection directions. The data collection directions include azimuthal angles of projection rays or lines-of-response that are perpendicular to the axis of symmetry of the scanner between detector elements in a same transaxial plane of the scanner and axial angles of oblique projection rays or lines of response between detector elements in different transaxial planes of the scanner. The projector also includes a rotator that re-samples the resultant image volume from the volume image memory by rotating the image matrix to a given azimuthal angle of the projection matrix and slanting the columns of the image matrix to each of the axial angles of oblique projection rays or lines-of-response at that given azimuthal angle such that columns of the image matrix align with each of the plurality of data collection directions of the projection matrix. The rotator applies a coarse-depth compression factor to the image matrix such that rows of the image matrix are collapsed onto one another in accordance with the coarse-depth compression factor so depth information of the rotated image matrix is compressed. Furthermore, image matrix rotation and slanting is performed using volume-of-overlap between 3D volumes of image matrix voxels and a 3D volume of said projection rays or lines-of-response and the oblique projection rays and lines-of-response, such that projection by summing the columns of the image matrix integrates the 3D volume contained within the volume-of-overlap.

Yet another aspect of an embodiment according to the present invention is a method of iterative fully-3D reconstruction of an image by positron emission tomography (PET) by a scanner having a plurality of detector elements. The method comprises estimating a resultant image volume and storing the image volume in an image matrix. The image matrix is rotated into alignment with an azimuthal angle of a projection ray or line-of-response between detector elements in a same transaxial plane of the scanner. The projection ray or line-of-response is perpendicular to an axis of symmetry of the scanner. The image volume is re-sampled at the azimuthal angle by slanting the image matrix to each axial angle of oblique projection rays or lines of response at that azimuthal angle. The oblique projection ray or line-of-response is between detector elements in different transaxial planes of the scanner such that columns of the image matrix align with a plurality of data collection directions. A coarse-depth compression factor is applied to the image matrix such that rows of the image matrix are collapsed onto one another in accordance with the coarse-depth compression factor so depth information of the rotated image matrix is compressed. The image is projected by summing the compressed columns of the image matrix.

Another aspect of an embodiment according to the present invention is a method of iterative fully-3D reconstruction of an image by positron emission tomography (PET) by a scanner having a plurality of detector elements. The method comprises estimating a resultant image volume and storing the image volume in an image matrix. The image matrix is rotated into alignment with an azimuthal angle of a projection ray or line-of-response between detector elements in a same transaxial plane of the scanner. The projection ray or line-of-response is perpendicular to an axis of symmetry of the scanner. The image volume is re-sampled at the azimuthal angle by slanting the image matrix to each axial angle of oblique projection rays or lines of response at that azimuthal angle. The oblique projection ray or line-of-response is between detector elements in different transaxial planes of the scanner such that columns of the image matrix align with a plurality of data collection directions. The image is projected by summing the columns of the image matrix by integrating a 3D volume contained within a volume-of-overlap. The image matrix rotation and slanting is performed using the volume-of-overlap between 3D volumes of image matrix voxels and a 3D volume of the projection rays or lines-of-response and the oblique projection rays or lines-of-response.

Another aspect of an embodiment according to the present invention is a method of iterative fully-3D reconstruction of an image by positron emission tomography (PET) by a scanner having a plurality of detector elements. The method comprises estimating a resultant image volume and storing the image volume in an image matrix. The image matrix is rotated into alignment with an azimuthal angle of a projection ray or line-of-response between detector elements in a same transaxial plane of the scanner. The projection ray or line-of-response is perpendicular to an axis of symmetry of the scanner. The image volume is re-sampled at the azimuthal angle by slanting the image matrix to each axial angle of oblique projection rays or lines of response at that azimuthal angle. The oblique projection ray or line-of-response is between detector elements in different transaxial planes of the scanner such that columns of the image matrix align with a plurality of data collection directions. A coarse-depth compression factor is applied to the image matrix such that rows of the image matrix are collapsed onto one another in accordance with the coarse-depth compression factor so depth information of the rotated image matrix is compressed. The image is projected by summing the columns of the compressed image matrix by integrating a 3D volume contained within a volume-of-overlap. The image matrix rotation and slanting is performed using the volume-of-overlap between 3D volumes of image matrix voxels and a 3D volume of the projection rays or lines-of-response and the oblique projection rays or lines-of-response.

Yet another aspect according to an embodiment of the present invention is a positron emission tomography (PET) scanner. The PET scanner is comprised of a plurality of detector elements and a rotate and slant projector. The rotate and slant projector is comprised of a projection matrix, an image matrix and a rotator. The rotator re-samples a resultant image volume from a volume image memory by rotating the image matrix to a given azimuthal angle of the projection matrix and slanting columns of the image matrix to each axial angle of oblique projection rays or lines-of-response at that given azimuthal angle such that columns of the image matrix align with each of the plurality of data collection directions of the projection matrix. The rotator applies a coarse-depth compression factor to the image matrix such that rows of the image matrix are collapsed onto one another in accordance with the coarse-depth compression factor so depth information of the rotated image matrix is compressed and the image is projected by summing the compressed columns of the image matrix.

Another aspect according to an embodiment of the present invention is a positron emission tomography (PET) scanner. The PET scanner is comprised of a plurality of detector elements and a rotate and slant projector. The rotate and slant projector is comprised of a projection matrix, an image matrix and a rotator. The rotator re-samples a resultant image volume from a volume image memory by rotating the image matrix to a given azimuthal angle of the projection matrix and slanting columns of the image matrix to each axial angle of oblique projection rays or lines-of-response at that given azimuthal angle such that columns of the image matrix align with each of the plurality of data collection directions of the projection matrix. The rotator performs image matrix rotation and slanting using volume-of-overlap between 3D volumes of image matrix voxels and a 3D volume of the projection rays or lines-of-response and the oblique projection rays or lines-of-response, such that projection by summing columns of the image matrix integrates the 3D volume contained within the volume-of-overlap.

Another aspect according to an embodiment of the present invention is a positron emission tomography (PET) scanner. The PET scanner is comprised of a plurality of detector elements and a rotate and slant projector. The rotate and slant projector is comprised of a projection matrix, an image matrix and a rotator. The rotator re-samples a resultant image volume from a volume image memory by rotating the image matrix to a given azimuthal angle of the projection matrix and slanting columns of the image matrix to each axial angle of oblique projection rays or lines-of-response at that given azimuthal angle such that columns of the image matrix align with each of the plurality of data collection directions of the projection matrix. The rotator applies a coarse-depth compression factor to said image matrix such that rows of the image matrix are collapsed onto one another in accordance with the coarse-depth compression factor so depth information of the rotated image matrix is compressed. Image matrix rotation and slanting is performed by the rotator using volume-of-overlap between 3D volumes of image matrix voxels and a 3D volume of said projection rays or lines-of-response and the oblique projection rays and lines-of-response, such that projection by summing the columns of the image matrix integrates the 3D volume contained within the volume-of-overlap.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are not to scale and are incorporated in and constitute a part of this specification, illustrate embodiments according to the invention and together with the description, serve to explain the principles of the invention:

FIG. 5 is an exemplary illustration showing the volumetric nature of LORs or projection rays;

FIG. 7 shows example images of the Deluxe Jaszczak Phantom, qualitatively demonstrating the image quality that can be obtained with an embodiment of the projector described herein and 3D LOR-OSEM;

DETAILED DESCRIPTION

Figure 1A:
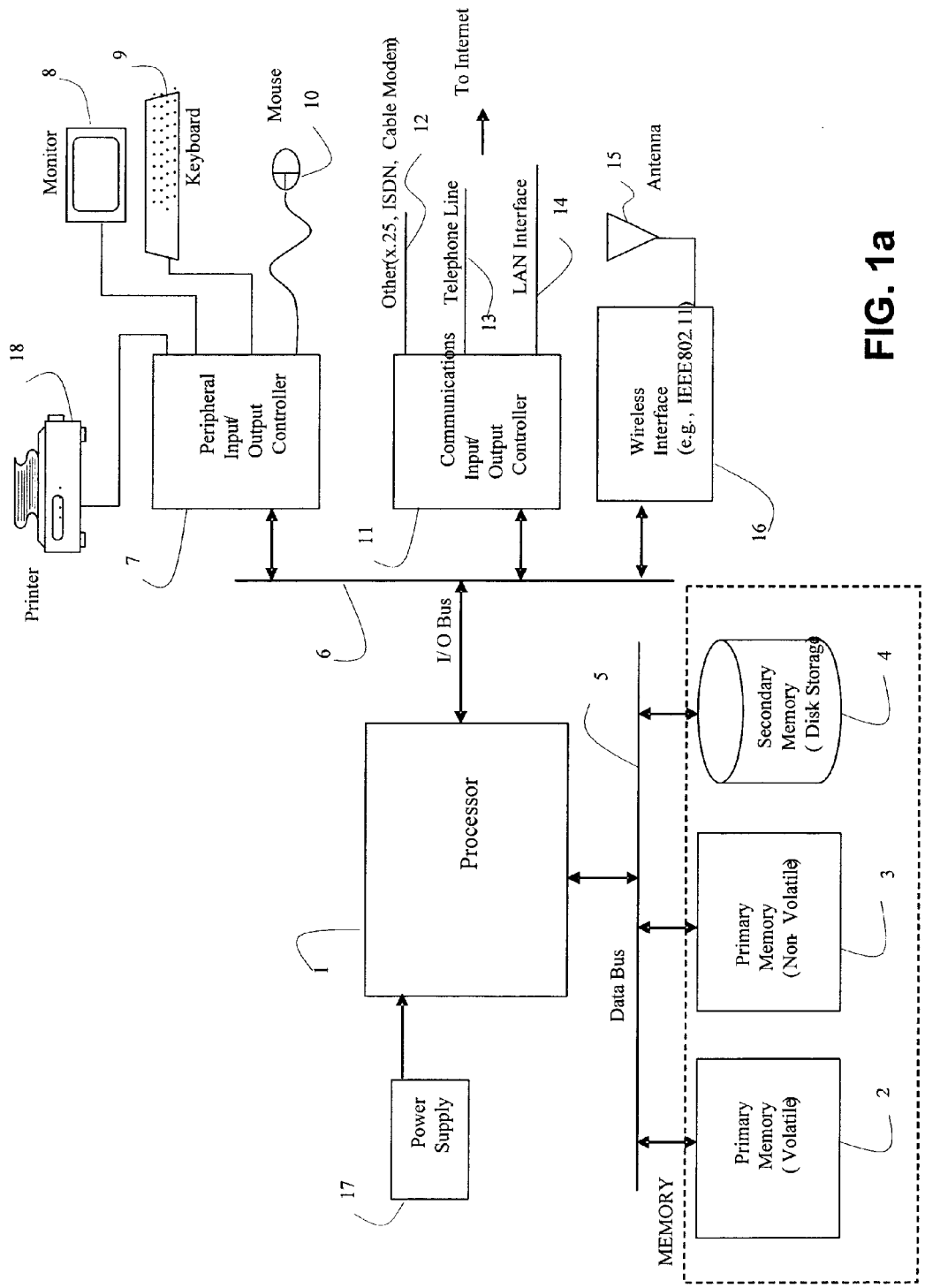
FIG. 1a is an illustration of an embodiment of a computing device that can be used to practice aspects of the present invention.

Before the present methods and systems are disclosed and described, it is to be understood that this invention is not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present invention may be understood more readily by reference to the following detailed description of preferred embodiments according to the invention and the Examples included therein and to the Figures and their previous and following description.

As will be appreciated by one skilled in the art, the preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Computer or Computing Device

In the embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a scanner used for tomography. In some instances the computer may be a "dumb" terminal used to access data or processors over a network. Turning to FIG. 1a, one embodiment of a computing device is illustrated that can be used to practice aspects of the preferred embodiment. In FIG. 1a, a processor 1, such as a microprocessor, is used to execute software instructions for carrying out the defined steps. The processor 1 receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
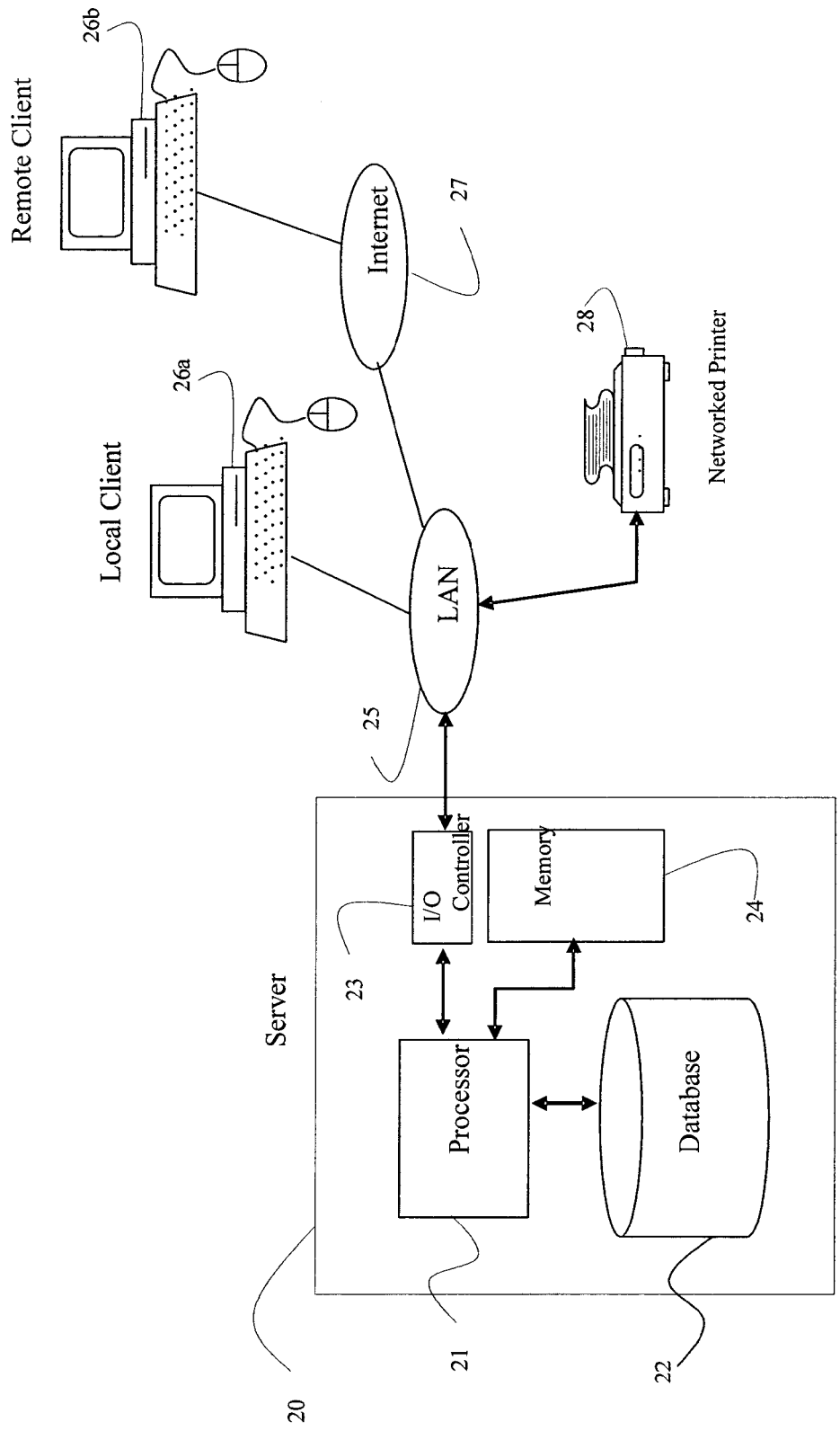
FIG. 1b is an alternative embodiment of a processing system that may be used to practice aspects of the present invention.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Those skilled in the art of data networking will realize that many other alternatives and architectures are possible and can be used to practice the preferred embodiments. The embodiments illustrated in FIGS. 1a and 1b can be modified in different ways and be within the scope of the present invention as claimed.

Overview

Described herein are embodiments of a projector (and backprojector) for iterative fully-3D PET reconstruction that offers full utilization of iterative statistical reconstruction algorithms, has low computational cost, and is amenable to modeling the physics and spatially-variant resolution effects of the PET acquisition. The projector (and backprojector) can map to either regularly-spaced ("arc-corrected") projections or directly from the image to the raw coincidence line-of-response (LOR) measurement space (and vice versa), such that the projection operation explicitly models the non-uniform spacing of the coincidence lines acquired by modern PET tomographs. The term "LOR-based" reconstruction is used to set apart methods that directly reconstruct the raw coincidence-LORs of the scanner from those that operate on arc-corrected sinograms. In effect, the "arc correction" is incorporated into the projector/backprojector of the reconstruction itself, avoiding interpolations and other degradations that occur when pre-processing projection data prior to reconstruction.

"LOR" is used generally to refer to the geometric linkage between a pair of detector elements in coincidence. In increasing order of complexity, a LOR may be approximated/interpreted as a line between the centers of detector elements, as a 2D strip between elements within a slice, as a 3D volumetric "tube" connecting the surface areas of two detector elements, or as the spatially-distributed 3D sensitive volume of image space that has potential to give rise to true coincidence events in the pair of detector elements in question.

The broad class of LOR-based reconstruction methods includes both algorithms that reconstruct from raw LOR histograms as well as listmode algorithms that operate on an event-by-event basis, as are known to those of ordinary skill in the art. By reconstructing directly from the raw LOR measurements, the Poisson statistical nature of the PET data is preserved, and the full benefits of maximum-likelihood (ML) statistical reconstruction can be realized.

Embodiments of the projector described herein, which can generally be referred to as the rotate-and-slant projector, take advantage of certain symmetries in the fully-3D geometry to provide efficient projection to multiple oblique sinogram sets. Embodiments according to the present invention re-sample the image via rotation so that the columns align with the projection bins at a given azimuthal angle and implements a LOR sampling scheme, which provides volumetric integration over the geometric LOR volumes, and that is readily configured for incorporation of spatially distributed sensitive volumes (i.e., the spatially variant point spread function). Embodiments of the projector provides a convenient image-based framework for modeling effects such as the spatially-variant geometric point response function and scatter; easily adapt to a wide variety of scanner geometries; have modest memory requirements; and can be used to project and/or reconstruct any voxel size without the need for any special setup. Software used to implement embodiments according to the present invention can be incorporated into a computing device of a scanner, such as a PET scanner, or be configured to analyze data from a scanner on a separated computing device. Non-limiting exemplary scanners that can be used according to embodiments of the present invention include General Electric Advance™ high-resolution BGO PET scanners (GE Healthcare, United Kingdom) and Biograph Sensation 16™ Hi-REZ Model LSO PET/CT scanner (Siemens Medical Solutions USA, Inc., Malvern, Pa.), though other scanners are contemplated within the scope of the invention.

Figure 1C:
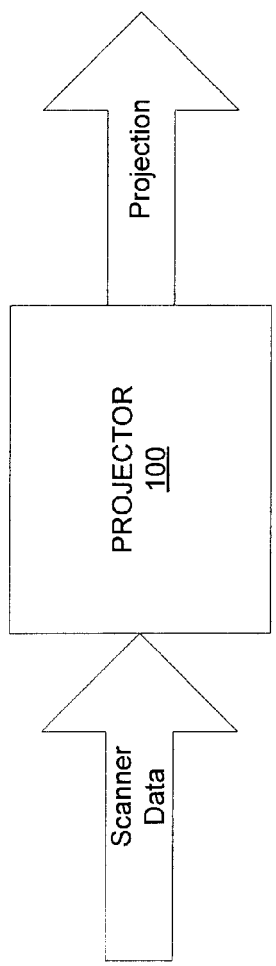
FIG. 1c is an elementary exemplary representation of an embodiment of a projector according to the present invention.
Figure 1D:
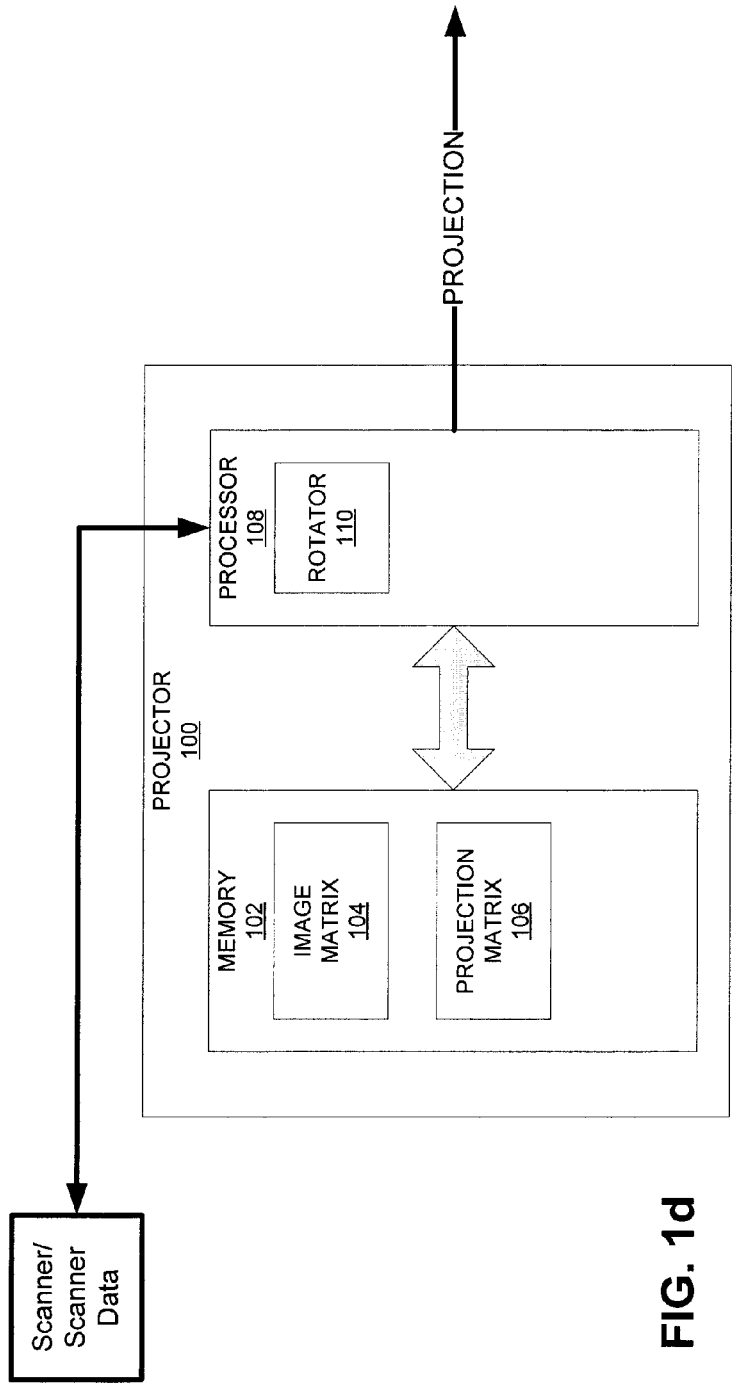
FIG. 1d is a more-detailed exemplary representation of an embodiment of a projector according to the present invention.

FIG. 1c is an elementary representation of an embodiment of a projector in accordance with the present invention. In FIG. 1c, data from a scanner is received by a projector 100, acted upon by the projector, and output as a projection of the subject or a portion of the subject under consideration. FIG. 1d is a more detailed illustration of components that comprise an exemplary projector 100. These components include a memory 102 containing an image matrix 104 and a projection matrix 106, as both are described herein, and a processor 108 whereupon operates a rotator 110, also described herein.

Rotate-and-Slant Projector

Figure 2:
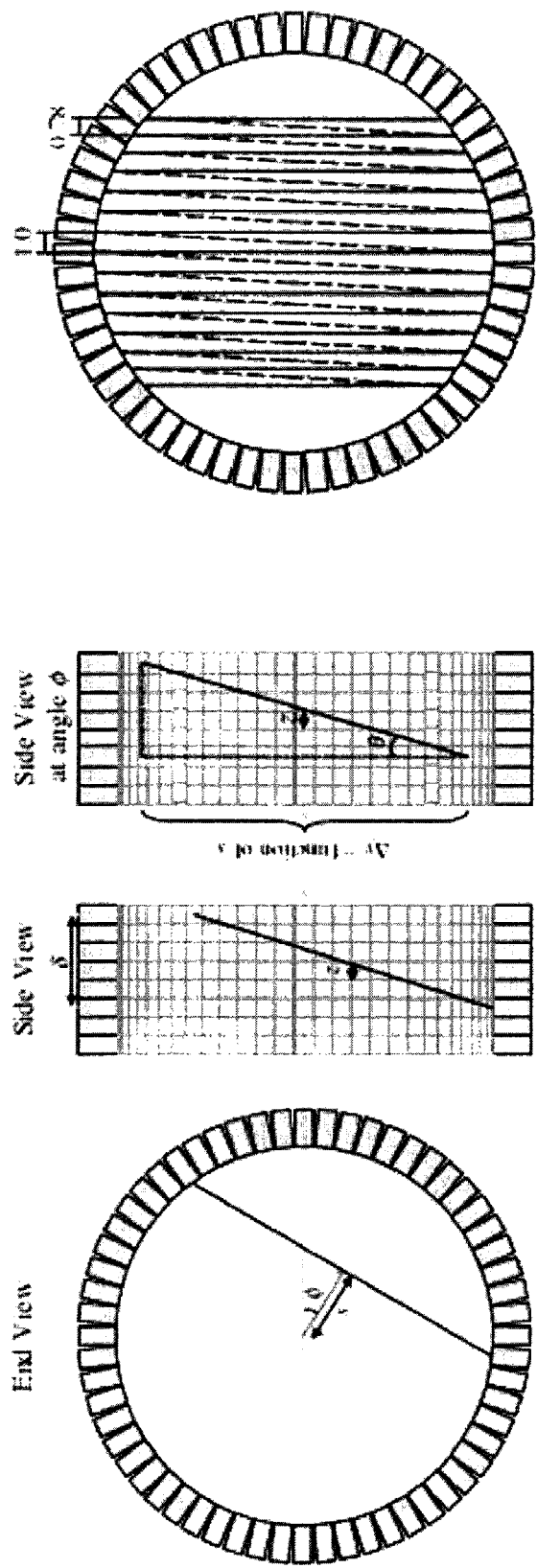
FIG. 2 illustrates an exemplary geometric arrangement of detector elements of a scanner that may be used to practice the present invention.
Figure 3:
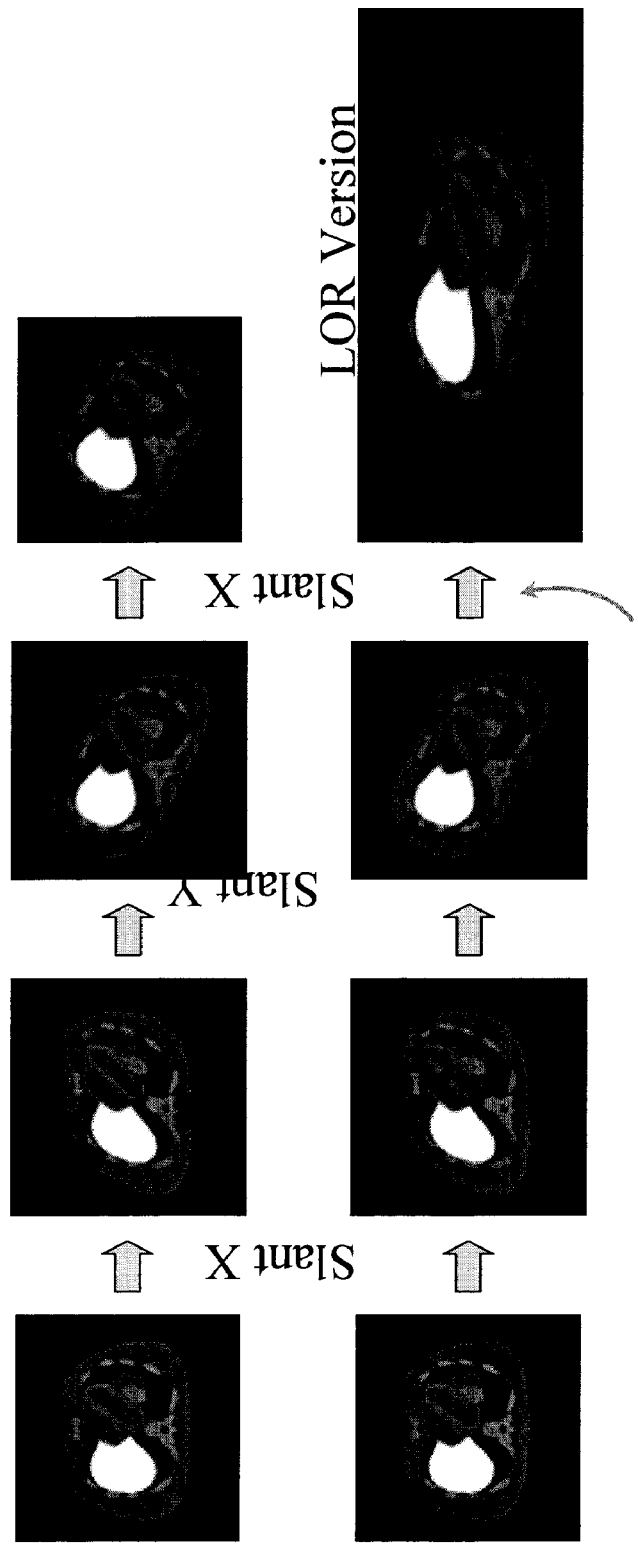
FIG. 3 illustrates an exemplary process of a three-pass method of shears, which breaks down the 2D rotation process into a series of three computationally efficient 1D shears.

FIG. 2 illustrates an exemplary arrangement of detector elements of a scanner that may be used to practice the present invention. In particular, FIG. 2 shows the (s, $\phi$, z, $\delta$) coordinate system used to parameterize fully-3D LORs for a generic ring PET tomograph. Embodiments according to the present invention employ projection computations that can be grouped and shared among LORs based on symmetries of the measurement geometry of the system shown in FIG. 2. These grouped and shared computations result in embodiments of a computationally-efficient fully-3D projector according to the present invention. Similar to a rotation-based projector for 2D tomography, as known to one of ordinary skill in the art, embodiments of a rotate-and-slant projector work by re-sampling the image stored as an estimated volume image representation in a volume image memory so that the columns of an image matrix align with rays or lines-of-reconstruction of a projection matrix. Projection is then accomplished by summing the columns of the re-sampled image matrix. In 2D, this re-sampling amounts to rotating the image matrix to azimuthal angle $\phi$. Embodiments according to the present invention use a three-pass method of shears, as exemplary illustrated in FIG. 3, for this rotation, which breaks down the 2D rotation process into a series of three computationally efficient 1D shears.

For fully-3D PET, the 2D rotation—based projector can be used for projecting to direct sinograms (ring difference $\delta$=0). For oblique sinograms ($\delta \neq 0$), the projection rays or lines-of-reconstruction are not perpendicular to the axis of symmetry of the scanner and lie at some polar angle $\theta$. Here, the image matrix is slanted (axial shear) so that the re-sampled columns of the image matrix align with the oblique projection rays or lines-of-reconstruction as shown in FIG. 4.

Figure 4:
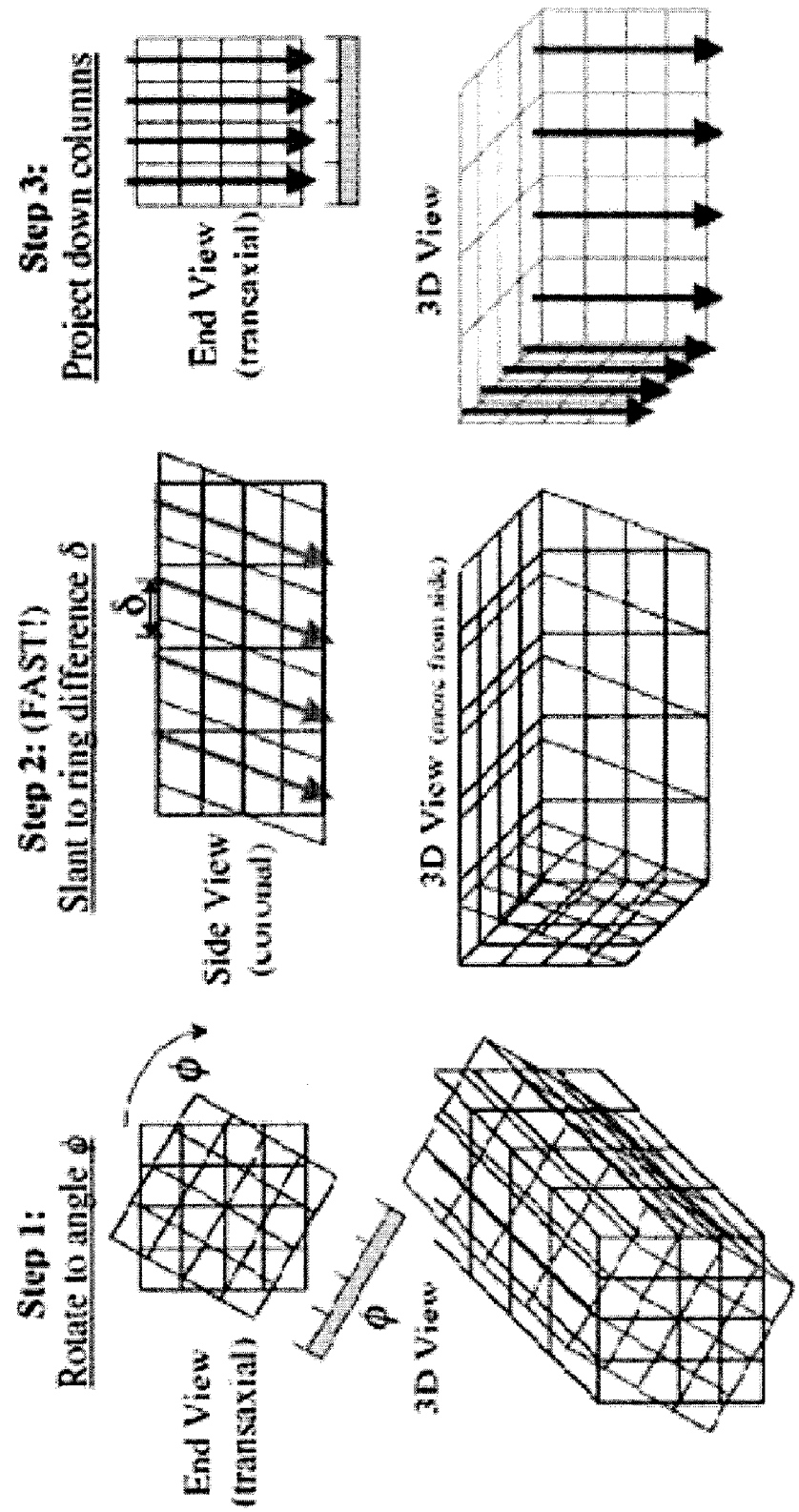
FIG. 4 illustrates three steps of a rotate and slant projector according to embodiments of the present invention.

FIG. 4 illustrates three steps of a rotate and slant projector according to the present invention. Embodiments of the projector include a rotation processor or algorithm (also referred to as a "rotator"), which rotates the estimated volume image representation in a volume image memory to a selected projection direction. In Step 1, the image matrix is rotated by the rotator to azimuthal angle $\phi$ (refer to FIG. 2). At Step 2, the columns of the image matrix are slanted (axially sheared) to the ring difference, δ. This axial slant is a 1D depth-dependent interpolation operation that can be performed much faster than the 2D rotation operation of Step 1. Furthermore, since the image can be rotated once, stored in memory, then slanted repeatedly to all ring differences, the computational cost of projecting to multiple ring differences is a relatively small increase over projecting to a single ring difference. As a result, the rotate-and-slant projector has high computational efficiency for projecting to datasets with large numbers of ring differences. At Step 3 of FIG. 4, the columns of the re-sampled matrix are summed as projection occurs down the columns. An integrator or summing means adds corresponding pixels or voxels of each of the layers of data from the columns of the image matrix. The weighted sum of the layers forms a projection or reprojection of the estimated volume image representation in the volume image memory along the selected direction, in particular, the direction of projection rays or lines-of-reconstruction. A reconstruction algorithm forms a ratio of collected projection data and the reprojected projection. The ratio is backprojected. The backprojected volumes of correction factors are summed and used to correct the estimated volumetric image in the volumetric image in the volumetric image memory. The corrected estimated volume image is again projected and the resultant reprojections are again ratioed with the corresponding projection data and the process is repeated. In each successive iterative repetition, the stored estimated volumetric image comes to approach the resultant volumetric image more closely.

Backprojection, which is the transpose of the operations of FIG. 4, is likewise computationally efficient since 1D slants from all ring differences can be summed prior to a single rotation back to the image space. Projection to all segments is additionally speeded through the use of coarse-depth compression as further described herein.

In one embodiment, a fully-3D rotate and slant projector according to the present invention is an inherently volumetric projector in that the projection operation of summing the columns of the re-sampled image matrix corresponds to integrating the 3D volume contained within the voxels of the image matrix. The volumetric nature of the LORs is exemplified in FIG. 5. In other embodiments according to the present invention, the projector acts as a ray- or line-driven projector and treats the projection rays as 1D linear elements rather than volumetric elements.

Incorporation/Modeling of Object- and System-Dependent Effects

Embodiments of a rotate-and-slant projector, as described herein, provide a convenient image-based framework for modeling object- and system-dependent measurement effects. These effects can be separated into three classes: (1) multiplicative effects such as attenuation, uniformity and deadtime, which affect the sensitivity of individual LORs; (2) additive effects such as randoms and scatter, which contribute to the number of prompt coincidences measured but do not provide high resolution spatial information; and (3) geometric effects which map the precise location of each individual LOR including finite point responses caused by positron range, non-collinearity effects, and depth-of-interaction. Incorporation of each of type of effect into embodiments of the rotate-and-slant projector is similar to the method used for the 2D rotation-based projector as known to those of ordinary skill in the art, and details on implementing the geometric arc correction for oblique LORs are provided below.

LOR Position: The rotate-and-slant projector can incorporate the interpolation to unevenly-spaced LORS, or "arc correction", directly into the rotator as described in FIGS. 2 and 3. The resampling is performed during the final shear of the 3-pass method-of-shears rotator. By incorporating the resampling directly into the rotator, a separate interpolation step for the arc correction is avoided, thus yielding both less interpolation error and high computational efficiency. This was described in detail for the 2D case in D.J. Kadrmas, "LOR-OSEM: Statistical PET Reconstruction From Raw Line-of-Response Histograms," *Phys. Med. Biol.*, vol. 49, pp. 4731-4744, 2004, which is fully incorporated by reference herein and made a part hereof, and application to embodiments of the 3D projector directly follow the method for the 2D projector.

For fully-3D data, there are additional complexities in the exact positioning of oblique LORs. For example, as shown in FIG. 2, the polar angle for a given ring difference actually changes as a function of s for a cylindrical scanner. Similarly, "direct plane" and "cross plane" slices are usually stacked by alternating between even and odd ring differences to form a final slice thickness that is one-half the ring spacing. This causes the polar angle for oblique LORs at adjacent slices to alternate in value. In both cases described above, the exact position and polar angle of each LOR is easily modeled in the slant step of the rotate-and-slant projector (making it a spatially-variant 1D operation), providing an exact LOR-based projector, which avoids many of the approximations commonly used in other PET projectors.

Computational Efficiency and Optimizations

Embodiments of a rotate-and-slant projector can be implemented in C computer programming language as is known in the art, though it is to be appreciated that other programming languages can be utilized and are contemplated within the scope of the invention. Employed within the code that comprises projector embodiments are a number of optimizations to reduce the processing time required for projection and reconstruction. Embodiments according to the present invention exploit a number of symmetries and other numerical matters to greatly improve the computational efficiency of the projector. Computational enhancements can have their effects upon projection and reconstruction times measured using the 3D ordered-subsets expectation-maximization (OSEM) algorithm, as known to one of ordinary skill in the art. Measurements of CPU processing times can be performed on a single-CPU such as, for example, a 2.66 GHz Intel Xeon Linux workstation, though it is to be appreciated that other CPUs or processors are contemplated within the scope of this invention. It is also to be appreciated, however, that embodiments according to the present invention can be implemented using parallel-implementations on multiple processors as desired.

Coarse-Depth Compression: When using a rotation-based projector, the volume-integral computations correspond to summing each column of the rotated image as shown in relation to FIG. 4. Essentially, each row of the rotated image corresponds to a different "depth" between detector elements (in scanners having a cylindrical symmetry, the "zero" depth can be considered to fall halfway between the detector elements—i.e., at the plane intersecting the axis of the detector cylinder—and depth-dependent effects will often be vertically symmetric about this zero depth). Projection to oblique segments involves a depth-dependent axial shear operation ("slant") which resamples the rotated image to the oblique LORs. Since the oblique LORs are at small angles away from vertical (θ is small), relatively little depth information is required to accurately perform this slant. Embodiments according to the present invention incorporate a coarse-depth compression factor into the rotator which collapses the image vertically during the second X shear (reference FIG. 3), essentially compressing the depth information of the rotated image. As a result, both memory utilization and the number of operations to perform multiple slants to the oblique segments are reduced.

Figure 6B:
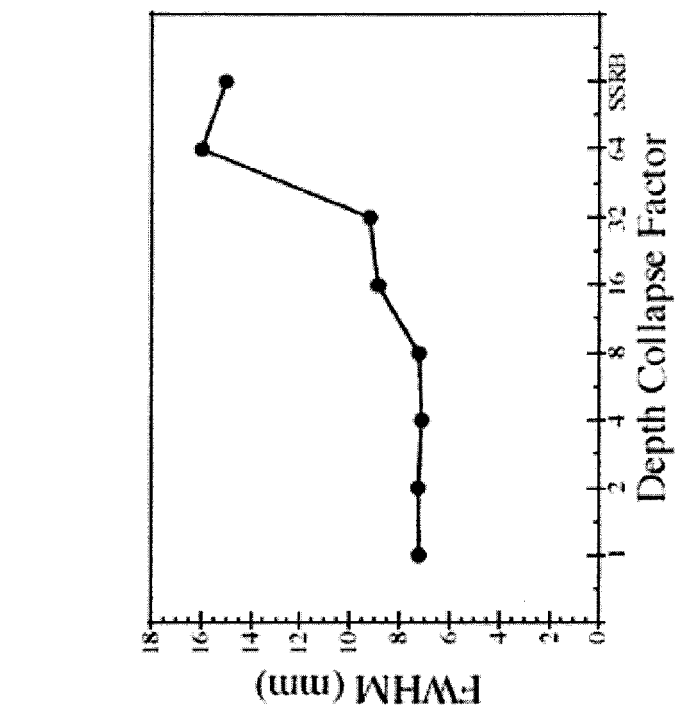
FIGS. 6a and 6b are exemplary illustrations of the effect of using coarse-depth compression factors upon projection time (FIG. 6a) and object resolution in the axial direction (FIG. 6b)
Figure 6A:
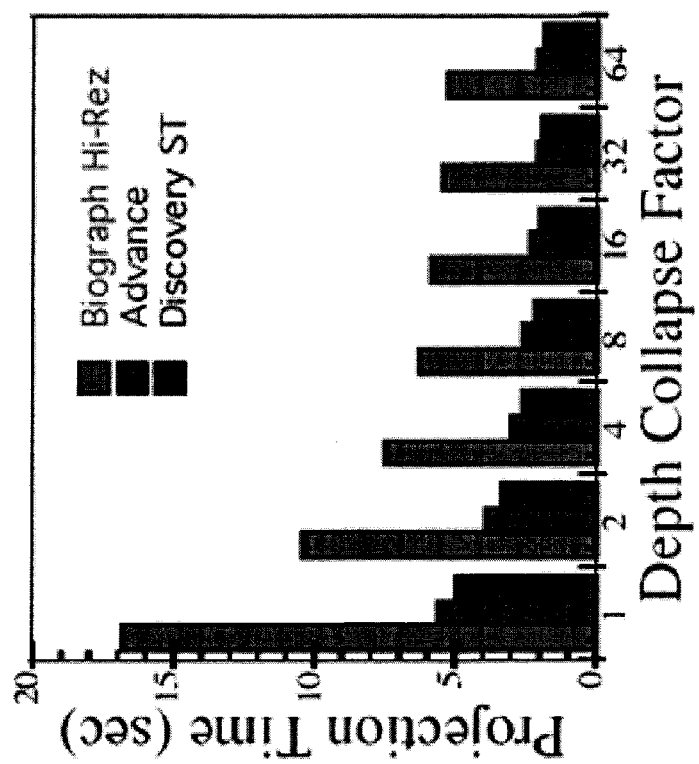

FIGS. 6a and 6b are exemplary illustrations of the effect of using coarse-depth compression factors upon projection time (FIG. 6a) and object resolution in the axial direction (FIG. 6b), measured as the full width at half maximum (FWHM) of the 13 mm diameter sphere in the NEMA phantom as imaged on the General Electric Discovery ST™ PET/CT scanner. Here, a large collapse factor effectively eliminates depth information from the data, producing axial blurring essentially the same as for single-slice rebinning (SSRB). It can be seen that projection times are markedly reduced for larger coarse-depth compression factors as compared to using all the depth information (i.e., coarse compression factor=1). FIG. 6b shows that the axial image resolution was largely unaffected for coarse-compression factors of about eight and below.

Array Indexing: The orders in which the reconstructed image matrix and projection data matrix arrays are indexed have an effect upon processing time. Accounting for the manner in which the arrays are accessed within the projector routine, the array indices can be ordered in such a way as to access contiguous blocks of memory when possible. For example, the 3D reconstructed image matrix would typically be indexed with three indices: the i,j position within transaxial slice k. This array would commonly be ordered such that i varies fastest, followed by j, and k would vary the slowest; this ordering is generally referred to as "i:j:k". In order words, the (i,j,k) element of the image array would be at memory location i+(Xdim*j)+(Xdim*Ydim*k), where Xdim, Ydim, and Zdim are the dimensions of the i, j, and k directions, respectively.

The i:j:k ordering is often efficient for applications which treat the image one slice at a time, e.g. a transaxial image display program. For fully-3D projection and reconstruction, however, it is preferable to treat the image volume as a whole. Considering the three steps of the rotate-and-slant projector as shown in FIG. 4, several different ordering schemes may be considered. Comparing projection and reconstruction times for three ordering schemes: i:j:k, k:i:j, and k:j:i., it can be seen that the degree of improvement for the different ordering schemes depends upon the image dimensions. The k:i:j ordering scheme consistently provides projection and reconstruction times that were about 41-66% as long as for i:j:k ordering, with k:j:i falling in between. This is caused at least in part because the innermost projection loop is a 1D axial interpolation procedure, and the k:i:j indexing allowed contiguous memory blocks to be accessed for this interpolation.

Two different projection data indexing orders were also studied in developing the embodiments according to the present invention, bin:slice:angle and slice:bin:angle. The slice:bin:angle indexing order was consistently found to be about 12-17% faster and is generally a preferable embodiment according to this invention; however it is also to be appreciated that bin:slice:angle indexing is contemplated within the scope of this invention. Overall, optimizing the image and projection data array ordering schemes resulted in almost a factor of two savings in projection and reconstruction times.

Vertical Projection Symmetry: The approximately cylindrical geometry of most modern scanners such as, for example, PET scanners provides what can be referred to as vertical symmetry for the projection operation. Referring back to FIG. 4, Step 2 of the rotate-and-slant projection utilizes a depth-dependent axial slant of the rotated image matrix. If the zero depth is defined to be at the center of the image matrix (i.e., at the depth of the axis of symmetry of the scanner), then the slant for rows at positive depths is the reverse of the slant for rows at negative depths. Since the slant requires a row-by-row 1D linear interpolation, the interpolation factors can be shared for the positive and negative depths. In effect, this replaces two multiplications with two additions for each voxel in the row, and this occurs within the innermost loop of the slanting routine. This can result in a time savings in the number of operations. For example, in one instance this resulted in a time savings of about 18%.

Other Optimizations: A number of other optimizations were also tested which had lesser impact upon the total processing time. For example, once the image matrix has been rotated to angle φ (refer to Step 1 of FIG. 4), the rotated image at angle+90° can rapidly be obtained by swapping the i- and j-indices of the rotated matrix. This can provide a moderate reduction in processing times, but may be less effective when the arc correction (for direct LOR-based reconstruction) is incorporated directly into the rotator.

EXAMPLES AND EVALUATION METHODS

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Implementation of an embodiment of a rotate-and-slant projector for LOR-based reconstruction according to the present invention utilizes knowledge of the LOR positions (including edges of the volumetric LORs) for the PET tomograph of interest, which can be accomplished using data tables for each scanner. The projector can be configured for various scanners such as, for example, the Biograph Hi-Rez™ scanner (Siemens Medical Solutions), and the Advance™ and Discovery ST™ scanners (General Electric Healthcare), though other scanners are contemplated within the scope of this invention.

Reconstruction Performance: Fully-3D iterative reconstruction performance with the proposed and conventional projectors were evaluated using five reconstruction schemes: (1) Fourier rebinning (FORE) followed by 2D attenuation-weighted OSEM (AW-OSEM) with the ray-driven projector; (2) conventional 3D AW-OSEM using the ray-driven projector, where the measured projection data were arc-corrected prior to the reconstruction step; (3) 3D LOR-OSEM using the ray-driven projector; (4) the distance-driven projector; and (5), an embodiment of the rotate-and-slant projector according to the present invention. The 3D LOR-OSEM methods reconstructed directly from the raw PET histograms (i.e., were ordinary Poisson methods), where all corrections including the arc-correction were incorporated in the projector/backprojector of the iterative reconstruction. In all cases, the exact same scatter+randoms estimates and attenuation normalization factors were used, though the order of implementation of each differed for schemes (1), (2), and (3)-(5) according to the requirements of each scheme. For example, the scatter+randoms estimate was pre-subtracted prior to FORE for reconstruction scheme (1); it was arc-corrected and then added to the forward projection of the iterative reconstruction for scheme (2); and it was added (without arc-correction) to the forward projections of schemes (3)-(5).

The different reconstruction schemes were evaluated and compared using experimentally acquired phantom data as described below:

NEMA Phantom Experiment: The NEMA image quality phantom was imaged in 3d mode on a Discover ST™ scanner (GE Healthcare). The phantom was filled with a total of 3.0 mCi $^{18}$F in water, and contained cold spheres of 37 and 28 mm diameter and hot spheres (*:1 target:background) of 17, 13 and 10 mm diameter. The phantom was centered in the scanner field-of-view and images for approximately 7.5 minutes. The raw data and scanner normalization was offloaded to a work station and the data were processed using each reconstruction method under investigation.

Resolution & Contrast Phantom Experiment. The rotate-and-slant projector was used to perform fully-3D LOR-OSEM reconstructions of the Deluxe Jaszczak Phantom (Data Spectrum Corp., Hillsborough, N.C.). The phantom contained a plastic insert of six wedges of hot rods with diameters 4.8, 6.4, 7.9, 9.5, 11.1, and 12.7 mm, arranged with center-to-center spacing in each wedge equal to twice the rod diameter. Six cold spheres of diameters 9.5, 12.7, 15.9, 19.1, 25.4, and 31.8 mm were also placed in the phantom. The background was filled with 50 MBq $^{18}$F-FDG in water, positioned on the imaging table of the Advance scanner (GE Healthcare) with the rods aligned with the long axis of the scanner, and centered in the field-of-view. High count data was acquired by scanning the phantom for 30 minutes in 3D mode with the septa retracted, saving delayed coincidences in a separate data file for future use. A 10 minute transmission scan was then acquired using rotating $^{68}$Ge pin sources. The scan data, plus all scanner calibrations, normalizations, randoms and scatter estimates were offloaded to a Linux workstation and processed offline into multiplicative, additive, and geometric components as described above. The data was reconstructed onto 128×128×35 image matrices with 2.0 mm in-plane pixels and 4.25 mm thick slices using 3D LOROSEM with 6 iterations and 16 subsets.

FIG. 7 shows example images of the Deluxe Jaszczak Phantom, qualitatively demonstrating the image quality that can be obtained with an embodiment of the projector described herein and 3D LOR-OSEM. The 4.8 mm rods are clearly resolved on this dataset, and the smallest 9.5 mm cold sphere is likewise clearly resolved. Small circles of radioactivity surrounding the support posts for the spheres can also be seen between the wedges of hot rods. The images for the rotate-and-slant projector and the other reconstruction methods show similar image quality, and the most significant differences noted were differences in reconstructed noise texture.

Analysis Methods: The reconstruction methods identified above were comparatively evaluated in terms of reconstructed image spatial resolution, hot-object contrast, and background noise, taking into consideration differences in the rate of iterative convergence resulting from the different LOR models inherent in different projectors. The effect of using coarse-depth compression upon axial resolution was analyzed by fitting Gaussian distributions to axial profiles of the 13 mm diameter hot sphere from the NEMA phantom experiment. The full-width at half-maximum (FWHM) of the fitted Gaussians were analyzed as a function of coarse-depth compression factor, and compared to those for reconstruction using SSRB.

Three analysis measures were computed for the Deluxe Jaszczak phantom experiment: (1) the average peak/valley ratio for the wedge of 4.8 mm hot rods, which is a measure closely-related to the recovered spatial resolution; (2) the contrast of the 12.7 mm diameter cold sphere was computed as (FG−BG)/(FG+BG), yielding a figure-of-merit where 0.0 and 1.0 reflect no contrast and perfect contrast, respectively; and (3) the standard deviation of background voxels, quoted as a percent of the mean value for a large (256 voxel) background region of uniform activity concentration, was computed as a measure of statistical noise in the image. These three measures were first computed as a function of iteration, and then the noise measure was analyzed as a function of the resolution and contrast measures to account for differences in the rate of iterative recovery of image features for each of the reconstruction methods.

Figure 8A:
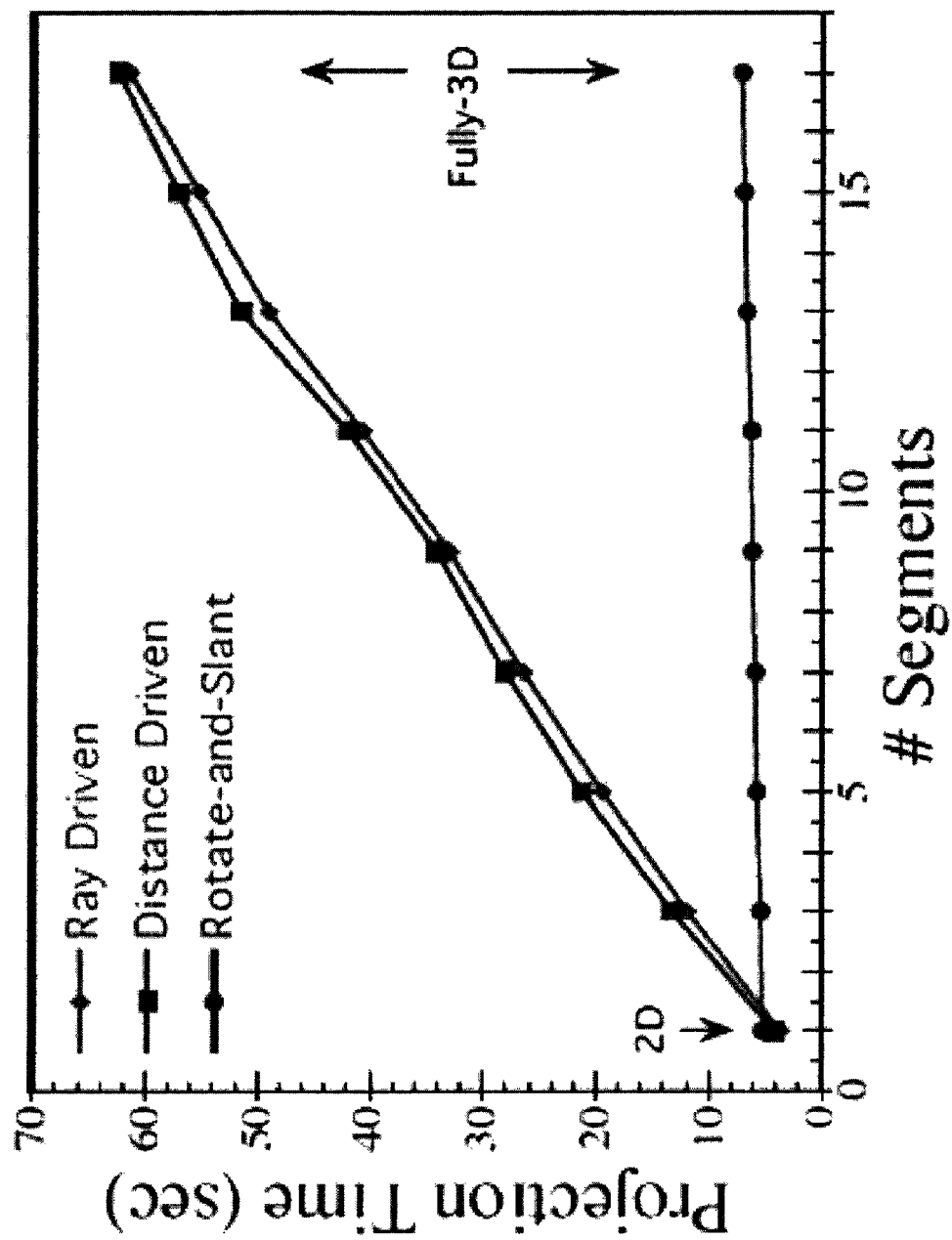
FIGS. 8a and 8b show the full projection and iterative reconstruction times as a function of the number of oblique datasets included according to an example of an embodiment of the present invention.
Figure 8B:
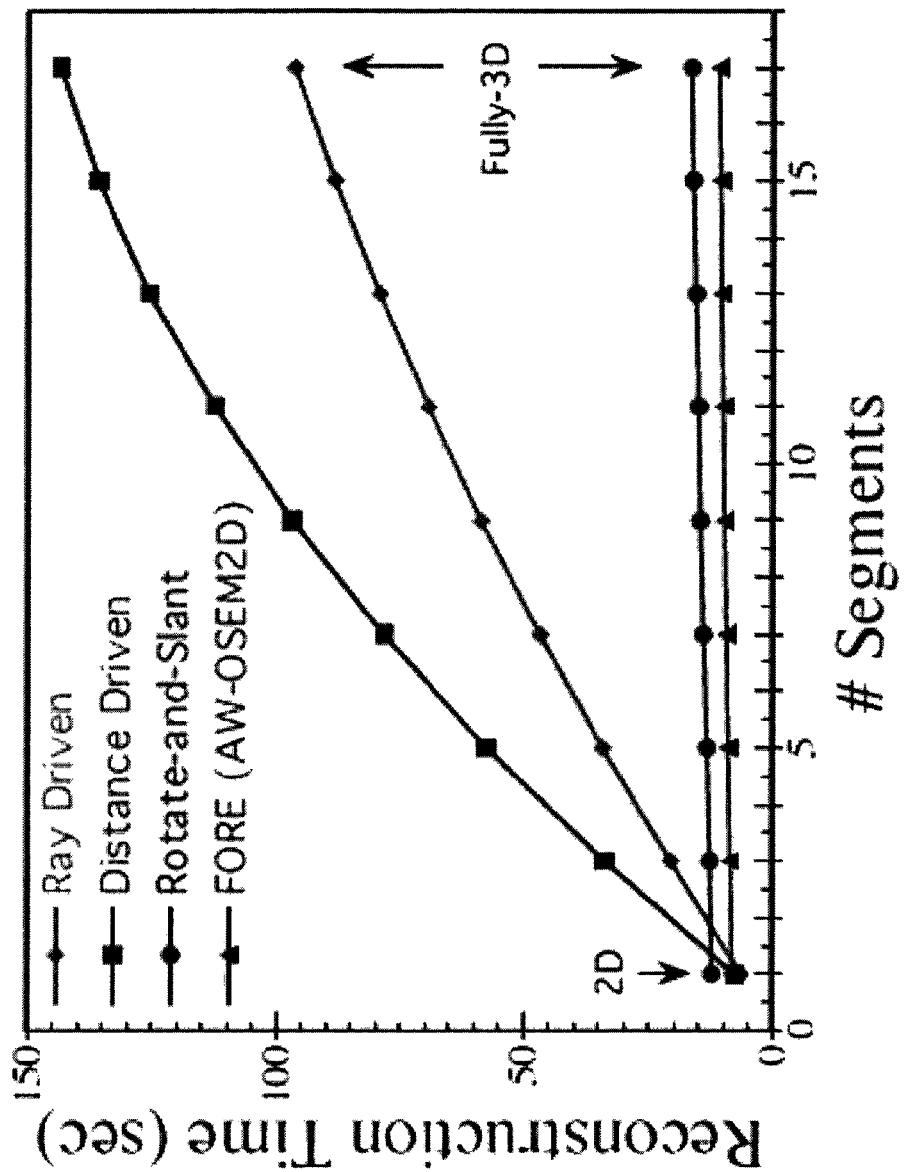

Projection and Reconstruction Times: In one instance, the CPU time required for fully-3D projection and 3D LOR-OSEM reconstruction were measured using datasets representative of several PET tomographs, including the Advance™ (GE, 283 LORs×336 angles, 35 slices), Discovery ST™ (GE, 249 LORs×210 angles, 47 slices), and Hi-Rez Biograph™ (Siemens Medical Solutions, 335 LORs×336 angles, 81 slices). The projection and reconstruction times were measured as a function of the number of oblique angles included in the reconstruction. For example, using a maximum ring difference of 25 and a span of 3, 17 sets of oblique sinograms would be obtained: (0,±1), (+2,+3,+4), (−2,−3,−4), . . . , (−23,−24,−25). FIGS. 8a and 8b show the full projection and iterative reconstruction times as a function of the number of oblique datasets included. The points on these curves, which are representative of common operating points for the three scanners, are marked. The projection and reconstruction times for 2D data using the rotation-based projector (same C programming code with same optimizations) are also marked on the figure.

It can be seen from FIGS. 8a and 8b that the projection time for an embodiment of a rotate-and-slant projector according to the present invention includes a component associated with 2D projection and increases from there linearly with the number of oblique segments. In comparison, the projection time for other fully-3D projectors, such as line- or ray-driven projectors, typically scales linearly with the total number of projection rays (LORs) because each oblique segment adds significant time to the computation. FIG. 8a shows the projection CPU times and FIG. 8b shows the full reconstruction times for four iterations of a fully-3D LOR-OSEM with 14 subsets for two modern OET scanners, plotted as a function of the total number of oblique segments included. The horizontal axes cover the range from 2D to fully-3D cases. Processing time for the conventional projectors scales poorly with increasing numbers of oblique segments, whereas an embodiment of the rotate and slant projector according to the present invention scales efficiently, even for the complete fully-3D cases. This is because of the manner in which embodiments of the rotate and slant projector efficiently conserve azimuthal operations for computing 3D projections to multiple oblique segments. Note that in FIG. 8b, the fully-3D LOR-OSEM with the rotate and slant projector is nearly as fast as rebinning followed by 2D reconstruction (FORE AW-OSEM2D).

Figure 9:
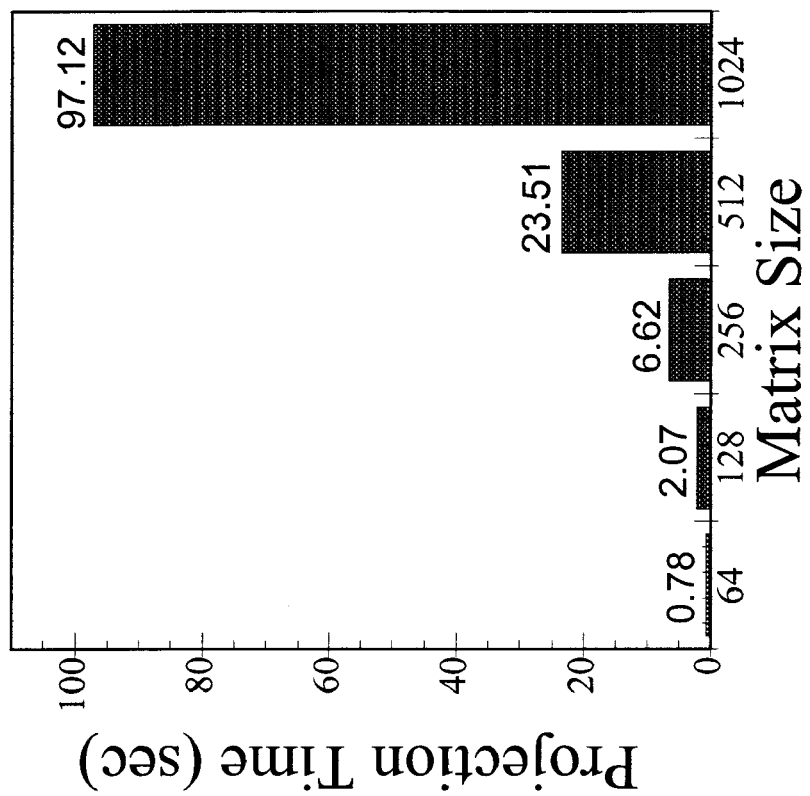
FIG. 9 shows how the projection time for the rotate-and-slant projector increases as a function of transaxial (transverse plane) image matrix size according to an example of an embodiment of the present invention.

FIG. 9 shows how the projection time for the rotate-and-slant projector increases as a function of transaxial (transverse plane) image matrix size. In FIG. 9, all the times are for projection of a 47 slice images to 249 LORs×210 angles×47 slices by 23 ring differences. The projection time scales roughly with the square of the image matrix dimension, and remains reasonable on modern computers for matrices as large as approximately 256×256. Larger matrix sizes are included in FIG. 9 to provide a rough approximation of how the projector would scale for use with other modalities such as, for example, x-ray CT.

Figure 10B:
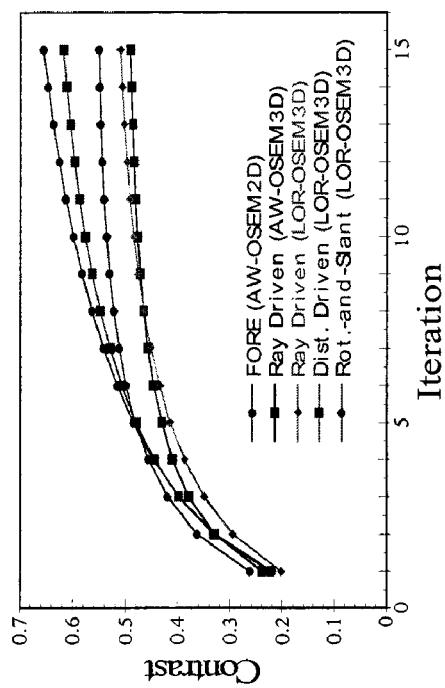
FIGS. 10a-10d illustrate results of a quantitative analysis of image quality for an embodiment according to the present invention where three image quality measures were studied for the Deluxe Jaszczak phantom.
Figure 10A:
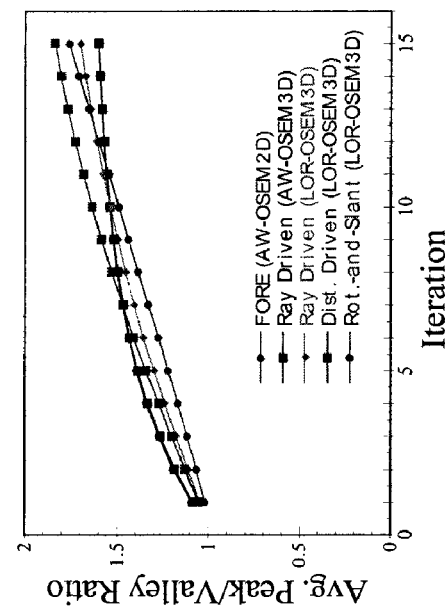
Figure 10D:
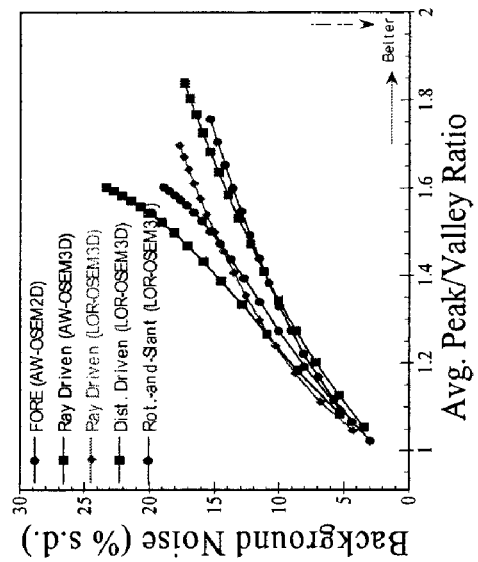
Figure 10C:
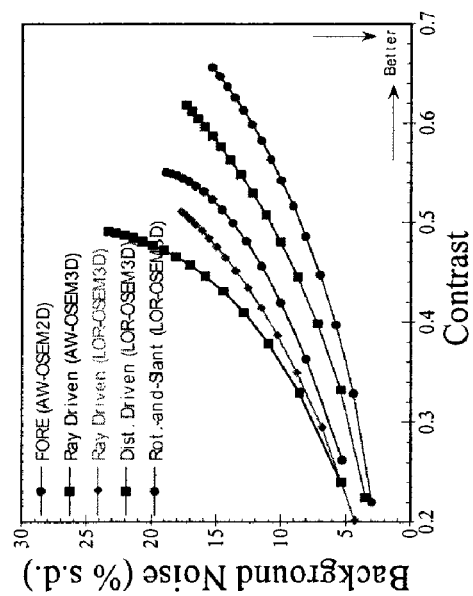

Projection Accuracy and Reconstructed Image Quality: Results of a quantitative analysis of image quality are shown in FIGS. 10a, 10b, 10c, and 10d. Three image quality measures were studied for the Deluxe Jaszczak phantom experiment described above: (1) the average peak/valley ratio for the 6.4 mm hot rods, providing a measure closely related to spatial resolution as shown in FIG. 10a; (2) the contrast ratio of the 12.7 mm cold sphere as shown in FIGS. 10b; and (3) the average background noise, calculated as the percent standard deviation versus the mean of the background as shown in FIGS. 10c and 10d. FIGS. 10 and 10b demonstrate differences in the rates of iterative recovery of these image features, which arise because of differences in the projection models for each of the methods. FIGS. 10c and 10d effectively normalize for this effect, permitting comparison of image noise as contrast resolution or contrast. The data demonstrate a trend toward improved image quality measures when moving from rebinning to 3D AW-OSEM to 3D LOR-OSEM. This reflects the improved statistical models of the fully-3D iterative methods, coupled with reduced image degradation when arc correction is included in the projector (LOR-based) as opposed to pre-correcting for this effect (AW-OSEM).

Methods of Use

Figure 11:
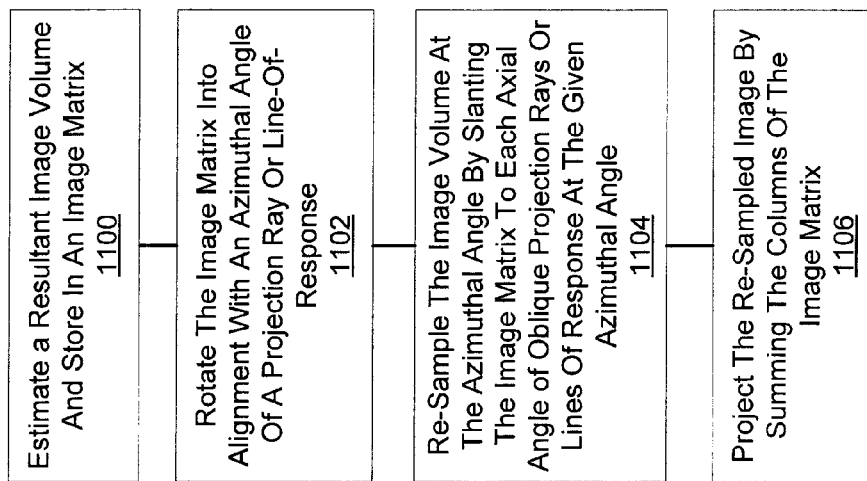
FIG. 11 is a flow chart illustrating an exemplary process for iterative fully-3D reconstruction of an image by positron emission tomography (PET) by a scanner having a plurality of detector elements.

FIG. 11 is a flow chart illustrating an exemplary process for iterative fully-3D reconstruction of an image by positron emission tomography (PET) by a scanner having a plurality of detector elements. At step 1100, a resultant image volume is estimated. The estimated image volume is stored in an image matrix in a memory. At step 1102, the image matrix is rotated into alignment with an azimuthal angle of a projection ray or line-of-response between detector elements in a same transaxial plane of the scanner. The projection ray or line-of-response is perpendicular to an axis of symmetry of the scanner. At step 1104, the image volume is re-sampled at the azimuthal angle by slanting the image matrix to each axial angle of oblique projection rays or lines of response at that azimuthal angle. The oblique projection ray or line-of-response is between detector elements in different transaxial planes of the scanner such that columns of the image matrix align with a plurality of data collection directions. At step 1106, the re-sampled image is projected by summing the columns of the image matrix. In some instances this may be accomplished by integrating a 3D volume contained within a volume-of-overlap. With volumetric integration, the image matrix rotation and slanting as described in steps 1102 and 1104, above, are performed using the volume-of-overlap between 3D volumes of image matrix voxels and a 3D volume of the projection rays or lines-of-response and the oblique projection rays or lines-of-response.

In other embodiments according to the present invention, a coarse-depth compression factor is applied to the image matrix such that rows of the image matrix are collapsed onto one another in accordance with the coarse-depth compression factor so depth information of the rotated image matrix is compressed, and the image is projected by summing the compressed columns of the image matrix.

Conclusion

While this invention has been described in connection with preferred embodiments and specific examples, it is not intended that the scope of the invention be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

REFERENCES

[1] M. Defrise, P. E. Kinahan, D. W. Townsend, C. Michel, M. Sibomana, and D. F. Newport, "Exact and approximate rebinning algorithms for 3-D PET data," *IEEE Trans. Med. Imag.*, vol. 16, pp. 145-158, 1997.

[2] X. Liu, C. Comtat, C. Michel, P. E. Kinahan, M. Defrise, and D. W. Townsend, "Comparison of 3-D reconstruction with 3D-OSEM and with FORE+OSEM for PET," *IEEE Trans. Med. Imag.*, vol. 20, pp. 804-814, 2001.

[3] M. Defrise and P. E. Kinahan, "Data acquisition and image reconstruction for 3D PET," in *The Theory and Practice of 3D PET* (The Netherlands: Kluwer Academic Publishers), B. Bendriem and D. W. Townsend, eds, pp. 11-54, 1998.

[4] D. J. Kadrmas, "LOR-OSEM: statistical PET reconstruction from raw line-of response histograms," *Phys. Med. Biol.*, vol. 49, pp. 473 1-4744, 2004.

[5] L. A. Shepp and Y. Vardi, "Maximum likelihood estimation for emission tomography," *IEEE Trans. Med. Imag.*, vol. 1, pp. 113-121, 1982.

[6] L. Lange and R. Carson, "EM reconstruction algorithms for emission and transmission tomography," *J. Comput. Assist. Tomogr.*, vol. 8, pp. 306-316, 1984.

[7] H. H. Barrett, T. White, and L. C. Parra, "List-mode likelihood," *J. Opt. Soc. Am. A*, vol. 14, pp. 29 14-2923, 1997.

[8] R. H. Huesman, G. J. Klein, W. W. Moses, J. Qi, B. W. Reutter and P. R. Virador, "List-mode maximum-likelihood reconstruction applied to positron emission mammography (PEM) with irregular sampling," *IEEE Trans. Med. Imag.*, vol. 19, pp. 532-537, 2000.

[9] C. Byrne, "Likelihood maximization for list-mode emission tomographic image reconstruction," *IEEE Trans. Med. Imag.*, vol. 20, pp. 1084-1092, 2001.

[10] E. C. Frey, Z. W. Ju, and B. M. W. Tsui, "A fast projector-backprojector pair modeling the asymmetric, spatially varying scatter response function for scatter compensation in SPECT imaging," *IEEE Trans. Nucl. Sci.*, vol. 40, pp. 1192-97, 1993.

[11] E. V. R. Di Bella, A. B. Barclay, R. L. Eisner, and R. W. Schafer, "A comparison of rotation-based methods for iterative reconstruction algorithms," *IEEE Trans. Nucl. Sci.*, vol. 43, pp. 3370-3376, 1996.

[12] A. Paeth, "A fast algorithm for general raster rotation," *Graphics Interface*, pp. 77-81, 1986.

[13] S. Vandenberghe, Y. D'Asseler, R. van de Walle, and I. Lemahieu, "Correction for external LOR effects in list-mode reconstruction for PET," in 2002 *IEEE International Symposium on Biomedical Imaging*, Washington, D.C., (IEEE Press) 2002.

[14] E. U. Mumcuoglu, R. M. Leahy and S. R. Cherry, "Bayesian reconstruction of PET images: methodology and performance analysis," *Phys. Med. Biol.*, vol. 41, pp. 1777-1807, 1996.

[15] S. R. Cherry, J. A. Sorenson and M. E. Phelps, *Physics in Nuclear Medicine*, $3^{rd}$ ed. (Philadelphia, Pa.: Saunders), 2003.

What is claimed is:

1. A method of iterative fully-3D reconstruction of an image by positron emission tomography (PET) by a scanner having a plurality of detector elements comprising:
   estimating a resultant image volume, wherein said image volume is stored in an image matrix;
   rotating the image matrix into alignment with an azimuthal angle of a projection ray or line-of-response between detector elements in a same transaxial plane of the scanner, wherein said projection ray or line-of-response is perpendicular to an axis of symmetry of the scanner;
   re-sampling said image volume at said azimuthal angle by slanting said image matrix to each axial angle of oblique projection rays or lines of response at that azimuthal angle, wherein each said oblique projection ray or line-of-response is between detector elements in different transaxial planes of the scanner such that columns of the image matrix align with a plurality of data collection directions;
   applying a coarse-depth compression factor to said image matrix such that rows of the image matrix are collapsed onto one another in accordance with the coarse-depth compression factor so depth information of the rotated image matrix is compressed; and
   projecting said image by summing the compressed columns of the image matrix.

2. The method of claim 1, wherein said scanner is comprised of a plurality of substantially adjacent rings of detector elements in its axial direction.

3. The method of claim 1, wherein said scanner is a PET scanner and said PET scanner includes said projector.

\* \* \* \* \*